(12) United States Patent
Atherton

(10) Patent No.: US 7,195,112 B2
(45) Date of Patent: Mar. 27, 2007

(54) CLUTCH COVER MECHANISM

(76) Inventor: Scott L. Atherton, 23199 SE. Hwy 212, Boring, OR (US) 97009

( * ) Notice: Subject to any disclaimer, the term of this patent is extended or adjusted under 35 U.S.C. 154(b) by 0 days.

(21) Appl. No.: 10/671,051

(22) Filed: Sep. 24, 2003

(65) Prior Publication Data

US 2005/0061604 A1   Mar. 24, 2005

(51) Int. Cl.
  *F16D 43/08* (2006.01)
(52) U.S. Cl. ............... 192/105 C; 192/70.3; 192/99 A
(58) Field of Classification Search ............ 192/105 C, 192/99 A, 70.29, 70.3, 89.26; 474/14
  See application file for complete search history.

(56) References Cited

U.S. PATENT DOCUMENTS

| | | | | |
|---|---|---|---|---|
| 1,025,190 A | * | 5/1912 | Jacobson | 192/70.3 |
| 1,197,245 A | * | 9/1916 | White | 192/70.3 |
| 1,746,213 A | * | 2/1930 | Church | 192/70.3 |
| 3,213,987 A | * | 10/1965 | Cook | 192/70.29 |
| 3,334,716 A | * | 8/1967 | Spokas | 192/70.29 |
| 3,580,372 A | * | 5/1971 | Schiefer et al. | 192/105 C |
| 3,630,333 A | * | 12/1971 | Schiefer et al. | 192/59 |
| 3,670,859 A | * | 6/1972 | Schiefer et al. | 192/99 A |
| 4,183,562 A | * | 1/1980 | Watkins et al. | 285/405 |
| 4,856,637 A | * | 8/1989 | Gebhart | 192/105 C |
| 4,986,403 A | * | 1/1991 | Tipton | 192/105 C |
| 5,033,598 A | * | 7/1991 | Tipton | 192/105 C |
| 5,361,882 A | * | 11/1994 | Tipton | 192/105 C |
| 5,785,163 A | * | 7/1998 | Bell | 192/105 C |
| 6,279,711 B1 | * | 8/2001 | Fehring | 192/105 C |
| 6,672,010 B1 | * | 1/2004 | Gledhill et al. | 49/341 |

* cited by examiner

*Primary Examiner*—Rodney H. Bonck
(74) *Attorney, Agent, or Firm*—FSP LLC

(57) ABSTRACT

A clutch lockout includes posts to receive bolts to retain the lockout to a clutch boss and retaining screw holes to retain lockout fingers mounted on the lockout. At least one indent in each post accommodates the retaining screw holes.

6 Claims, 6 Drawing Sheets

CLUTCH COVER MECHANISM

TECHNICAL FIELD

The present disclosure relates to clutch systems.

BACKGROUND

In motorized vehicles, the clutch enables the engine drive train to be disconnected from the axels during changes in the drive ratio. Often, the clutch provides a friction coupling between the drive train and the axels. This friction coupling (for example, contact between two fiber-compound discs) may be prone to slipping as the drive train rotations per minute (RPM) increase. To alleviate this condition, a clutch cover may be employed.

FIGS. 1 and 2 are front and back view illustrations, respectively, of a prior art clutch cover 100. The cover 100 may be employed in two and four stroke engine systems, such as Honda™ and Banshee™ motors for all terrain vehicles (ATVs). Bolts may be inserted through the holes 118 in the posts 106 to mount the cover 100 to a clutch flywheel of the engine. Heads of the bolts may recess into the counter-sink holes 120. The shaft of the bolts may pass through springs. As the bolts are tightened to the clutch flywheel, the springs come under tension, recessing the heads of the bolts into the holes 120, and bringing the posts 106 into contact with a clutch pressure plate.

FIG. 3 is a side view illustration of a clutch finger 300. The finger 300 has an arm 306 and a cam 304. A bolt may be inserted through the hole 308 and secured with a nut to add weight to the end of the arm 306. A pivot may be inserted through the hole 302 at the juncture of the arm 306 and the cam 304. Fingers 300 may be inserted into the slots 110 of the cover 100 and the pivot may be recessed into the slots 112. Retaining screws may be threaded into the holes 114, and tightened until their heads are recessed into the countersink holes 116, thus securing the finger pivots in the slots 112.

Forming a hole 102 in the cover 100 lessens the weight and may accommodate possible protrusions of the transmission system. Forming bays 108 also lessens the weight of the cover 100.

As engine RPMs increase, the arms 306 of the fingers 300 are drawn outward by centrifugal force, rotating the cam 304 against a pressure plate mounted behind the cover 100. Rotation of the cams 304 against the pressure plate increases the force of the frictional coupling between the engine drive train and the axels, reducing slipping of the clutch at higher engine RPMs.

Weight and durability of system components are crucial factors in the performance of engine systems. An improved cover would benefit from further reductions in weight, while either improving or without compromising the durability of the cover.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A clutch cover includes posts to receive bolts to retain the cover to a clutch flywheel and retaining screw holes to retain clutch fingers mounted on the cover. At least one indent in each post accommodates the retaining screw holes and/or countersinks thereof. At least one edge of the cover is formed to create lips around slots to receive the clutch fingers. The lips may have a width narrower than the diameter of the retaining screw holes and/or the countersinks thereof. The cover may comprise two retaining screw holes for each clutch finger.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
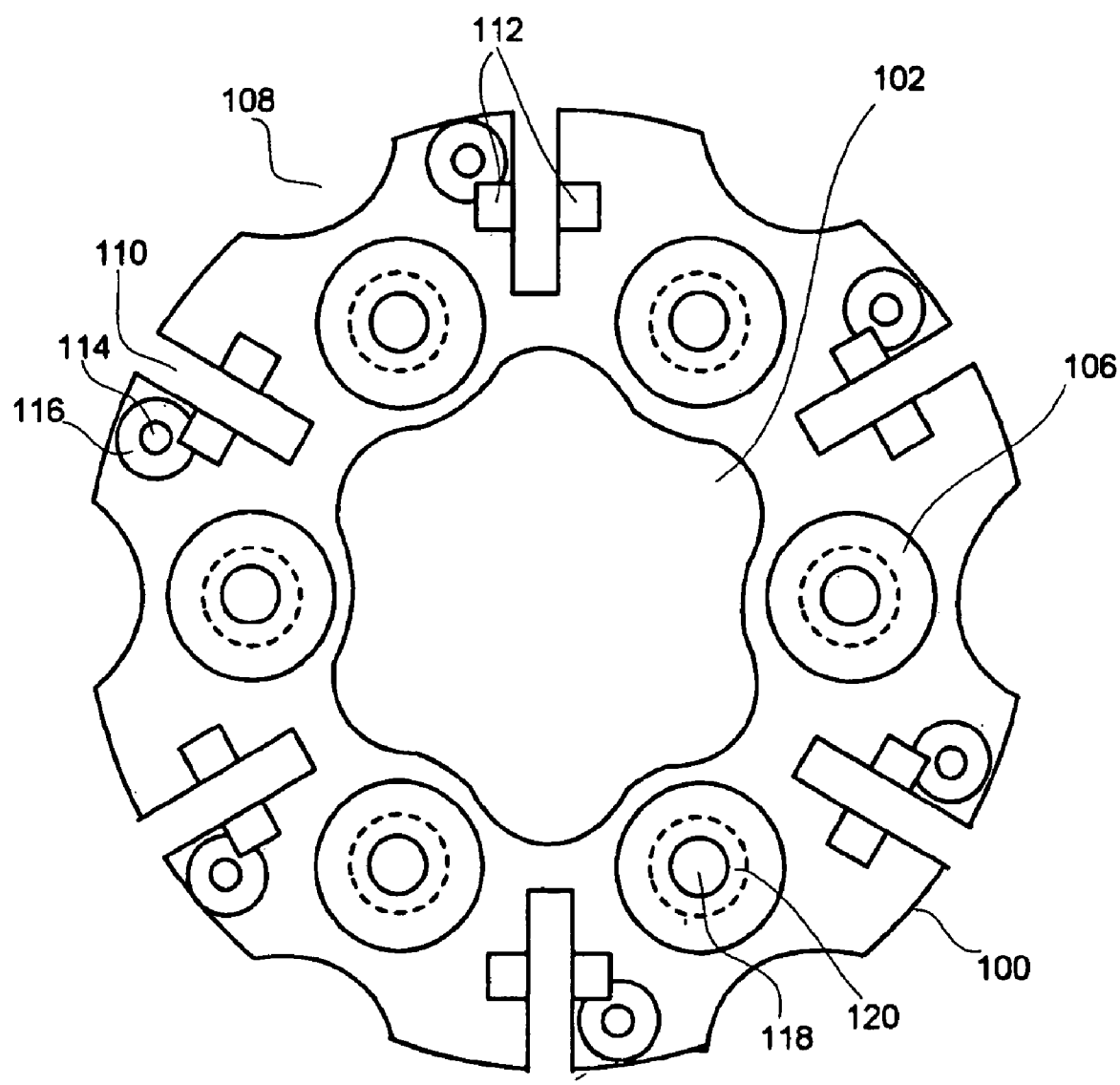
FIG. 1 is a front view illustration of a prior art clutch cover.
Figure 2:
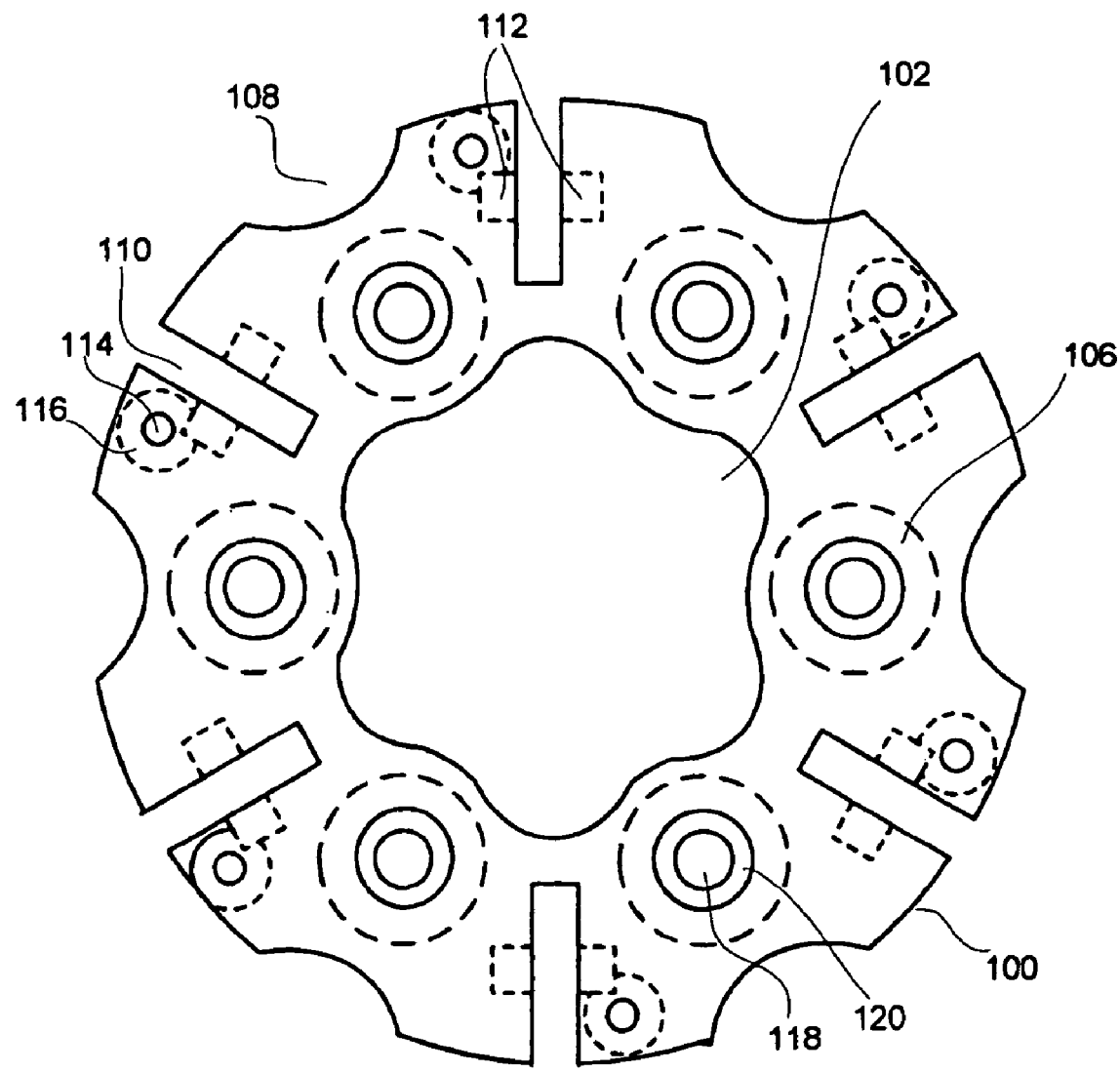
FIG. 2 is a back view illustration of a prior art clutch cover.
Figure 3:
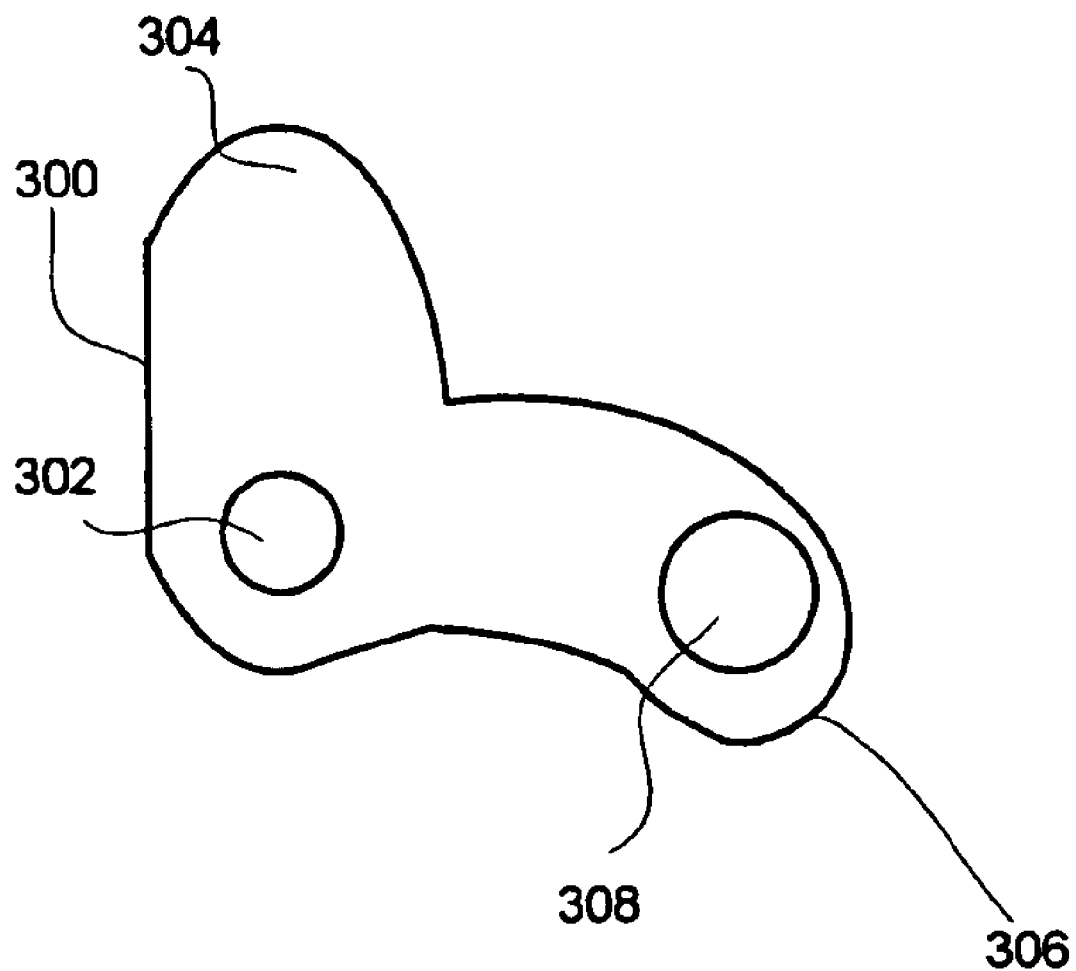
FIG. 3 is a side view illustration of a clutch finger.
Figure 4:
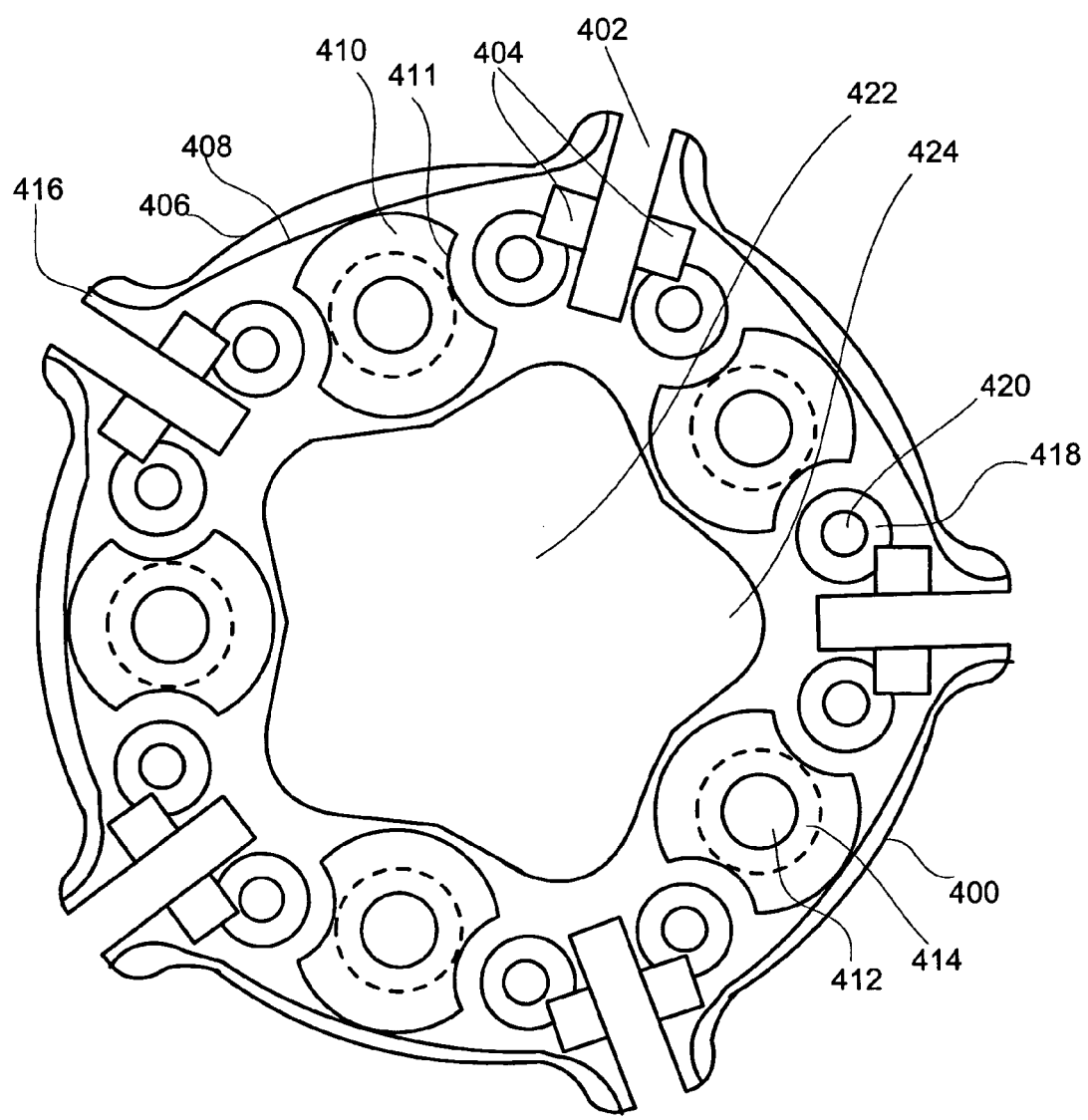
FIG. 4 is a front view illustration of an embodiment of a clutch cover.
Figure 5:
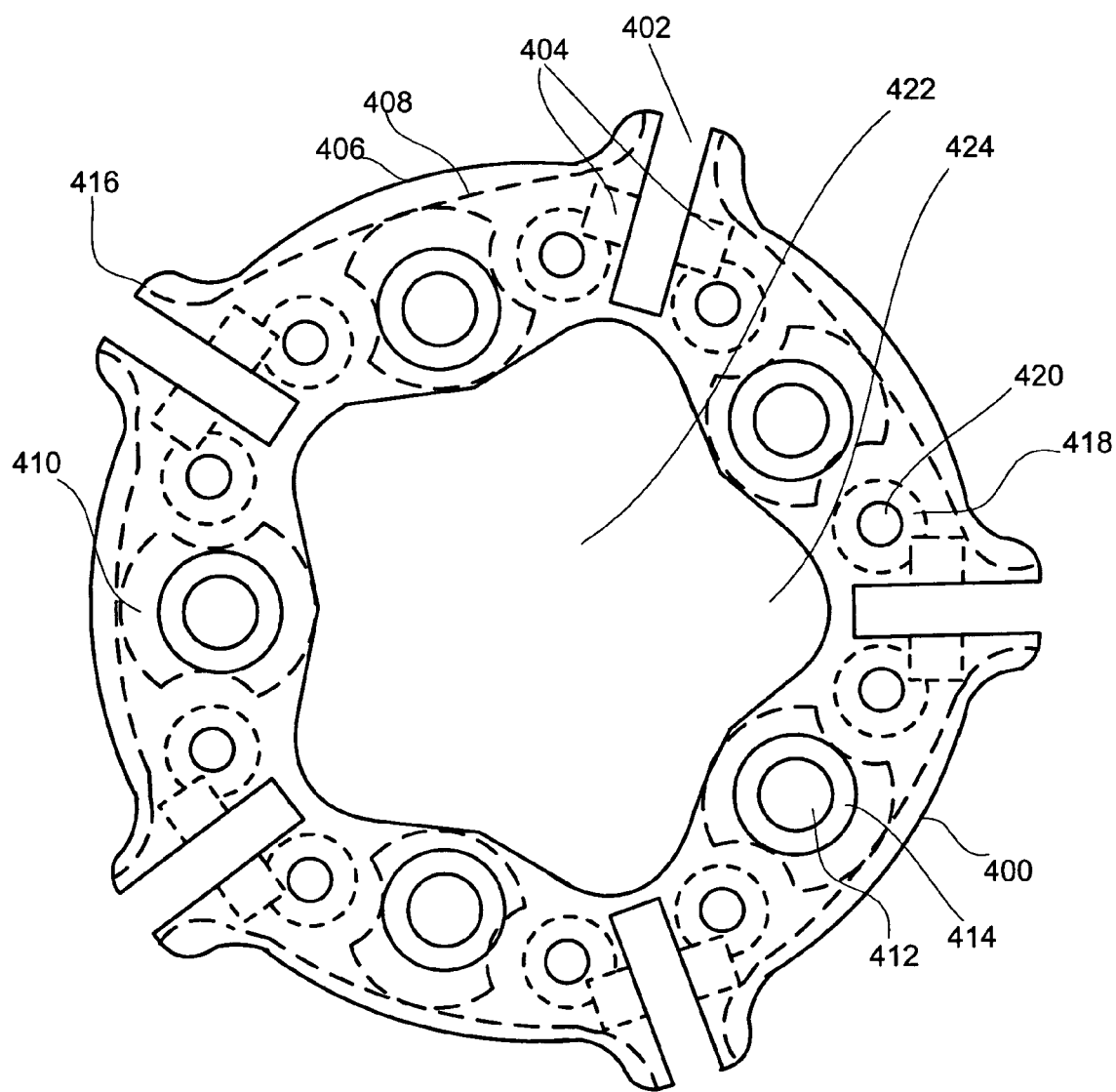
FIG. 5 is a back view illustration of an embodiment of a clutch cover.
Figure 6:
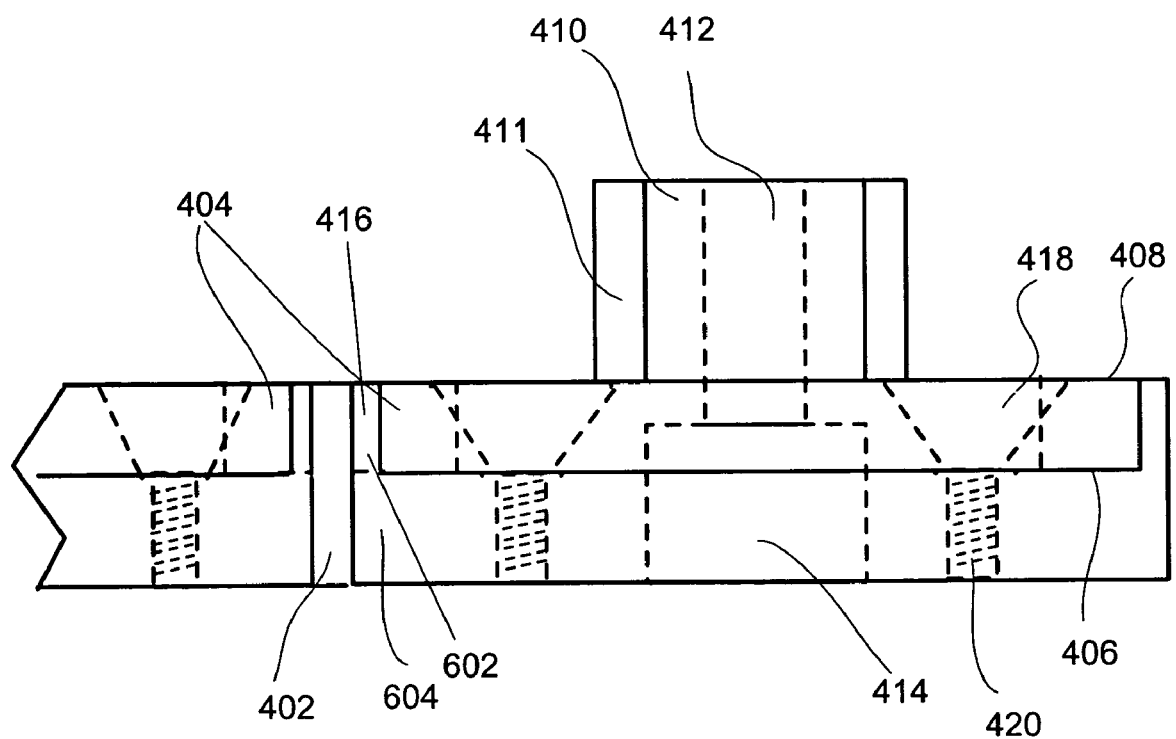
FIG. 6 is a side view illustration of an embodiment of a clutch cover.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of FIGS. 4–6 are front, back, and side view illustrations, respectively, of an embodiment of a clutch cover 400. Posts 410 are formed with indents 411. The posts 410 include holes 412 to receive bolts to mount the cover 400 to the clutch flywheel. Countersink holes 414 receive heads of the tightened bolts.

Fingers 300 may be inserted into the slots 402 of the cover 400 and a finger pivot (e.g. the pivot through finger holes 302) may be recessed into the slots 404. Retaining screws may be threaded into the holes 420, and tightened until their heads are recessed into the countersinks 418, which may overlap the slots 402, thus securing the finger pivots in the slots 404. The indents 411 in the posts 410 accommodate the holes 420 and/or the countersinks 418 of the holes 420, and enable positioning the holes 420 back from the edges 406, 408 of the cover 400. Positioning the holes 420 back from the edges 406, 408 enables the removal of a substantial amount of material, forming lips 416 around the slots 402, without compromising the durability of the cover 400. Material may be removed from the cover 400 to form the edges 406, 408, and to create lips 416 having a width narrower than the diameter of the countersinks 418 of the holes 420 to receive the retaining screws. The lips 416 may even have a width narrower than the diameter of the holes 420 themselves. The edges 406, 408 may form lips 416 having two portions 602,604, one portion narrower than the other. Two holes 420 and countersinks 418 may be provided per finger pivot, securing the finger pivots at two positions of the slots 404 and further improving durability.

Further weight reductions are achieved by forming a hole 422 and bays 424 in the cover 400.

Other embodiments may comprise additional or fewer posts 410, and additional or fewer slots 402, 404 for fingers 300 and pivots, respectively. In light of this disclosure, these and other modifications will now become apparent to those skilled in the art.

What is claimed is:

1. A clutch cover comprising:
a substantially flat plate-like body adapted to be disposed parallel to a clutch flywheel and pressure plate and adapted to rotate about a clutch rotation axis;
posts, each extending at a right angle to the plate-like body and parallel to the rotation axis, and each of said posts having an opening to receive a bolt for attaching the plate-like body to the flywheel;
retaining screw holes in said plate-like body adjacent said posts, said screw holes adapted to receive screws to retain clutch fingers on said plate-like body; and
at least one indent extending along a length of each of said posts on an exterior surface of each post and positioned to be in alignment with said retaining screw holes to permit the screws to be positioned closely adjacent the posts.

2. The cover of claim 1, further comprising:
slots to receive the clutch fingers; and
at least one edge formed to create lips around the slots, the lips having a width narrower than the diameter of countersinks of the retaining screw holes.

3. The cover of claim 2, further comprising:
the at least one edge formed to create lips having a width narrower than the diameter of the retaining screw holes.

4. The cover of claim 2, further comprising:
two edges forming lips with portions having different widths.

5. The cover of claim 1, further comprising:
slots to receive pivots of the clutch fingers; and
two retaining screw holes For each slot to receive a pivot.

6. The cover of claim 5, further comprising:
countersinks of the retaining screw holes overlapping the slots to receive pivots.

* * * * *